United States Patent [19]

Perry, Jr.

[11] 4,172,799

[45] Oct. 30, 1979

[54] OUTLET FOR SEPTIC TANKS

[76] Inventor: Carlos V. Perry, Jr., 9304 Stuart Ave., Manassas, Va. 22110

[21] Appl. No.: 940,627

[22] Filed: Sep. 8, 1978

[51] Int. Cl.² ............................................. B01D 21/02
[52] U.S. Cl. ................................................ 210/532 S
[58] Field of Search ............. 210/83, 170, 247, 532 R, 210/532 S, 538, 540; 239/504, 507, 512, 516, 517, 521, 594

[56] References Cited

U.S. PATENT DOCUMENTS

| | | | |
|---|---|---|---|
| 388,159 | 8/1888 | Tomlinson | 239/512 |
| 1,719,419 | 7/1929 | Bennett | 210/532 S X |
| 3,275,157 | 9/1966 | Stamps | 210/521 |
| 3,630,370 | 12/1971 | Quina | 210/538 X |
| 3,693,887 | 9/1972 | Brodlin et al. | 239/504 X |

FOREIGN PATENT DOCUMENTS 1036771  8/1954  Fed. Rep. of Germany ....... 210/532 S Primary Examiner—William A. Cuchlinski, Jr.
Attorney, Agent, or Firm—John H. Merchant

[57] ABSTRACT

A septic tank system having an improved outlet which may be readily installed in existing septic tanks without modification of the tank or outlet fittings, to prevent the discharge of particles of sewage suspended in the effluent from passing directly into the drain field, the outlet including a "T", a dual conic deflector composed of two cones joined at their bases and flexibly supported directly below the open lower end of the "T" to deflect therefrom effluent containing solid particles rising from the bottom of the tank during the fermentation process. The flexible mounting permits sidewise displacement of the conic deflector so that the upright portion of the "T" can be reamed to remove any accumulation of deposits therefrom, the conic deflector being weighted so as to return to its original position after the reaming operation has been completed.

10 Claims, 6 Drawing Figures

OUTLET FOR SEPTIC TANKS

BACKGROUND OF THE INVENTION

This invention relates, in general, to an improved septic tank system, and more particularly, to an improved outlet which may be readily installed in an existing septic tank of such systems without material alteration thereof, for handling wastes and sewage from industrial, commercial, and residential installations in rural areas where public disposal systems are not available.

These systems comprise essentially, a septic tank in which wastes and sewage are collected, the larger solid particles being divided into smaller particles, partly digested, and the resulting effluent discharged into a drain field.

The septic tank in such systems may vary in size and shape but usually is in the form of a closed rectangular box, preferably of concrete, although other materials, such as metal, are used in some systems. The size of the tank should be sufficient to provide a liquid depth of from 2½ to 5 feet, and of a volume sufficient to handle the anticipated wastes and sewage to be discharged into the tank.

Access to the interior of the septic tank is provided by a removable closure of appropriate size so that the undigested solids which form a layer of sludge at the bottom of the tank can be removed at periodic intervals.

Wastes and sewage are introduced into the upper portion at one end of the tank and discharged at the upper opposite end at a "T", the location of the lateral extension of the "T" determining and maintaining the desired level of liquid in the tank. A similar "T" may be used for the inlet to the tank, the upper open end of the "Ts" permitting any gas therein to pass into the space above the liquid level in the tank.

In operation, upon introduction of wastes and sewage through the inlet of the tank, the larger solid particles settle to the bottom of the tank where digestion is effected by fermentation due to the presence of anerobic bacteria, seeding being accomplished when fresh sewage is added. The bacteria involved in the digestion process thrive under anaerobic conditions.

While the larger particles of sewage settle and form a layer of sludge on the bottom of the tank, the effluent contains a considerable amount of finer sewage particles in suspension. It has been recognized for some time that if effluent containing these finer particles is permitted to pass directly into the drain field, the small particles clog the pores of the drain field and, in time, materially reduce its efficiency. Moreover, the fermentation process results in the formation of large volumes of gas rising through the sludge and effluent, the gas entrapping particles of sludge which are constantly mixed with the effluent before settling to the bottom of the tank. This increases to a marked extent the amount of sludge suspended in the effluent.

In the past means have been provided to remove as far as practicable the suspended particles from the effluent before it is discharged in order to maintain the efficiency of the drain field. The digestion process taking place in the septic tank also results in the formation of considerable amounts of scum which collects on the surface of the liquid within the tank and it is important that means be provided to retain the scum within the tank and prevent its discharge along with the effluent into the drain field.

These problems have been recognized and various means proposed in an effort to overcome these difficulties. Baffles of various forms have been devised to retain the scum within the septic tank and to divert the gas containing entrapped sewage particles away from the tank outlet in order not to impair the efficiency of the drain field.

THE PRIOR ART

The patent to OTTO, U.S. Pat. No. 2,143,248, issued Jan. 10, 1939, in addition to using vertical baffles to contain the scum layer within the tank, employs short plates fixed to the wall of the tank at an angle below the outlet to divert effluent containing suspended particles away from the outlet and afford additional time for the suspended solids to separate from the effluent and settle to the bottom of the tank with the sludge.

The patent to STAMPS, U.S. Pat. No. 3,275,157, issued Sept. 27, 1966, discloses a similar system in which the outlet of the septic tank is enclosed in a box-like housing to reduce the amount of suspended solids from being discharged into the drain field. The housing is open at the top and is provided at the lower end thereof with sloping sides forming a throat, partly closed with an angular shaped member which permits liquid to enter the housing but diverts much of the effluent containing suspended solids away from the tank outlet.

A more recent development is disclosed in the patent to QUINS, U.S. Pat. No. 3,630,370, issued Dec. 12, 1970, in which the outlet is in the form of a "T" or "L". In this system, in order to prevent most of the solid particles suspended in the effluent which rise from the bottom of the tank beneath the "T" or "L" from passing directly through the tank outlet, a conical deflector is fastened at its apex adjacent the lower open end of the "T" or "L" in such manner as to leave sufficient space for the effluent to pass through the outlet of the tank into the drain field. The upper surfaces of the conical member extend outwardly and beyond the opening in the "T" or "L" so that gas entrapped solid particles suspended in the effluent are deflected and returned to the septic tank.

In spite of these precautions, some particles of sludge suspended in the effluent do pass into and are deposited on the interior walls of the outlet of the "T" and from time to time must be removed. The most convenient and effective way to remove such deposits is to use a ram or reamer inserted in the open upper end of the outlet "T" but means must be provided whereby the conical diverter can be readily moved to one side to permit passage of a cleaning tool through the vertically disposed portion of the outlet "T".

It is an object of the present invention to provide a conical diverter which may be readily pushed aside during the cleaning operation but is so weighted as to return to its original position upon completion of the cleaning operation.

BRIEF DESCRIPTION OF THE INVENTION

The present invention relates, in general, to an improved septic system, and more particularly, to an improved outlet for such systems, which may be readily installed in new or existing septic tanks without alteration of the existing outlet or plumbing associated therewith, and inhibit the discharge of suspended particles of sewage directly into the drain field.

The system disclosed herein comprises a septic tank of conventional design in which sewage and wastes are introduced into the the upper portion at one end of the tank, preferably through a "T", and discharged at the upper opposite end, also through a "T", which is connected with a drain field.

Fermentation is effected in the tank by the presence of anerobic bacteria, the larger particles of sewage being divided into smaller particles during the digestion process, a portion of which settles to the bottom of the tank forming a layer of sludge. The sludge layer may be removed, when necessary, through a removable closure located in the top of the tank.

Gas developed during the fermentation and digestion process entraps a considerable amount of suspended solids and means must be employed to prevent the major portion of these solids, which rise below the lower opening of the outlet "T", from passing directly into the drain field. In the present improved system, a conical diverter element comprising two conical members, joined at their bases, are suspended directly below the inlet of the "T", serve this purpose.

However, in spite of these precautions, some particles do pass through the "T", are deposited on the interior walls thereof, and should be removed at periodic intervals in order to insure that the system operate in an efficient manner.

In order to permit relatively easy and effective cleaning of the interior surfaces of the outlet "T" with a minimum of labor, the present invention incorporates a novel flexible mounting for the conical diverter so that it may be moved aside to permit the insertion of a reamer or similar tool into the vertical openings to remove the deposits. A freely movable weight is enclosed within the di-cone unit so that the unit will return to its operative position upon withdrawal of the cleaning tool.

The conical flexibly mounted diverter may be mounted on the lower depending section of the outlet "T" with a standard coupling without modifying or altering the structure of existing systems or the plumbing associated therewith, or may be incorporated in new installations. The many advantages afforded by this novel unit will be apparent from the discription set forth in the following specification and illustrated in the accompanying drawings.

DETAILED DESCRIPTION OF THE INVENTION

Figure 1:
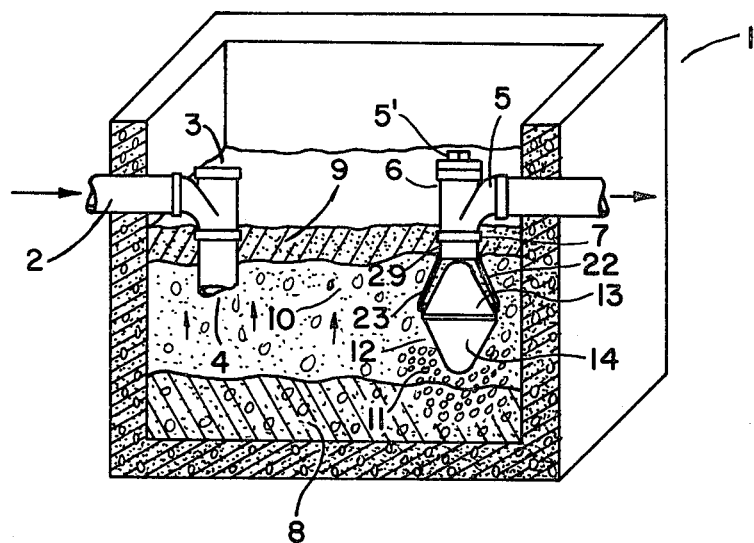
FIG. 1, is a cross-sectional view of a conventional septic tank, including an outlet "T" equipped with a conical diverter constructed in accordance with the present invention.

The present invention, which relates to an improved septic system, comprises, as shown in FIG. 1, of the drawing, a septic tank of conventional size and shape, designated generally by the numeral 1, preferably of concrete, the top of which is closed by a removable slab (not shown), to afford access to the interior of the tank. A smaller removable closure is usually provided in the slab for the removal of sludge from the tank without removing the entire top slab.

Sewage and wastes are piped into the upper portion at one of the tank through the inlet 2, in the form of a "T", having an open upper end 3, and a lower open end 4, and the effluent discharged at the upper opposite end of the tank through a similar "T", designated by the numeral 5. The upper and lower ends, 6, and 7, respectively, of the latter "T" are open, the laterally disposed section of the "T" being connected with a drain field (not shown), the height of the "T" determining the level of the effluent to be maintained in the tank. While the upper end of the outlet "T" is normally open, it may be closed by a removable cap 5'.

In operation, sewage and wastes are piped through the inlet 2, and digested sewage in the form of effluent discharged through the outlet "T", the direction of flow through the tank being indicated by arrows shown on the drawings.

The fermentation process taking place within the tank, due to the presence of anerobic bacteria, results in the formation of considerable amounts of gas, the undigested solids settling to the bottom of the tank as a layer 8. An accumulation of scum 9, also forms on the surface of the effluent 10. The walls of the upper leg 6, of the outlet "T" keep the scum from passing directly into the drain field.

The gas developed during the fermentation and digestive process rises from the bottom of the tank entrapping small particles of sludge 11, and in order to prevent the major portion of these particles from flowing into the drain field, a conical diverter, designated generally by the numeral 12, is suspended directly beneath the open lower end 7, of the outlet "T". The conical diverter 12, keeps, for the most part, the solid particles suspended in the effluent from passing through the outlet and into the drain field and directs these particles back into the septic tank where the digestive process continues. Most of these particles settle from the effluent and are deposited with the sludge layer on the bottom of the tank, or rise and collect in the scum layer.

Figure 2:
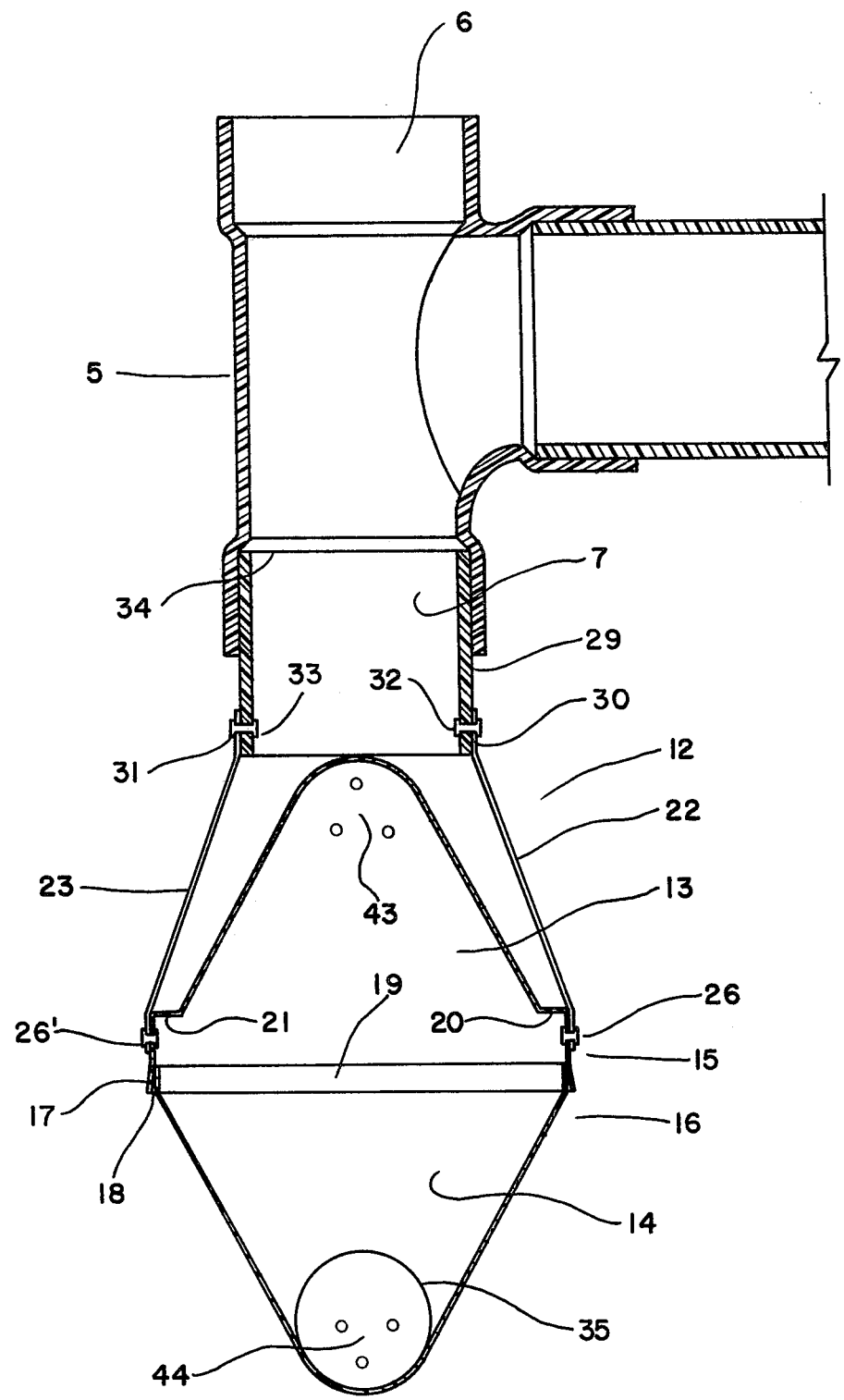
FIG. 2, is a detailed cross-sectional view of the flexibly mounted conical diverter.

The conical deflector 12, as shown in detail in FIG. 2, comprises a pair of similar mating cones 13, and 14, the apexes of which have a rounded configuration, joined at their bases 15, and 16, respectively. As illustrated in detail in FIG. 3, cone 13, is provided with a relatively short flat, slightly flared section 17, adjacent its base 15, the other mating cone 14, having a similar and corresponding flat section 18, of slightly less diameter to fit snugly within mating cone 13, to form a tight joint. The two cones, upon being joined together with a suitable adhesive, form a substantially uniform di-cone member having a reinforced center section 19.

Figure 3:
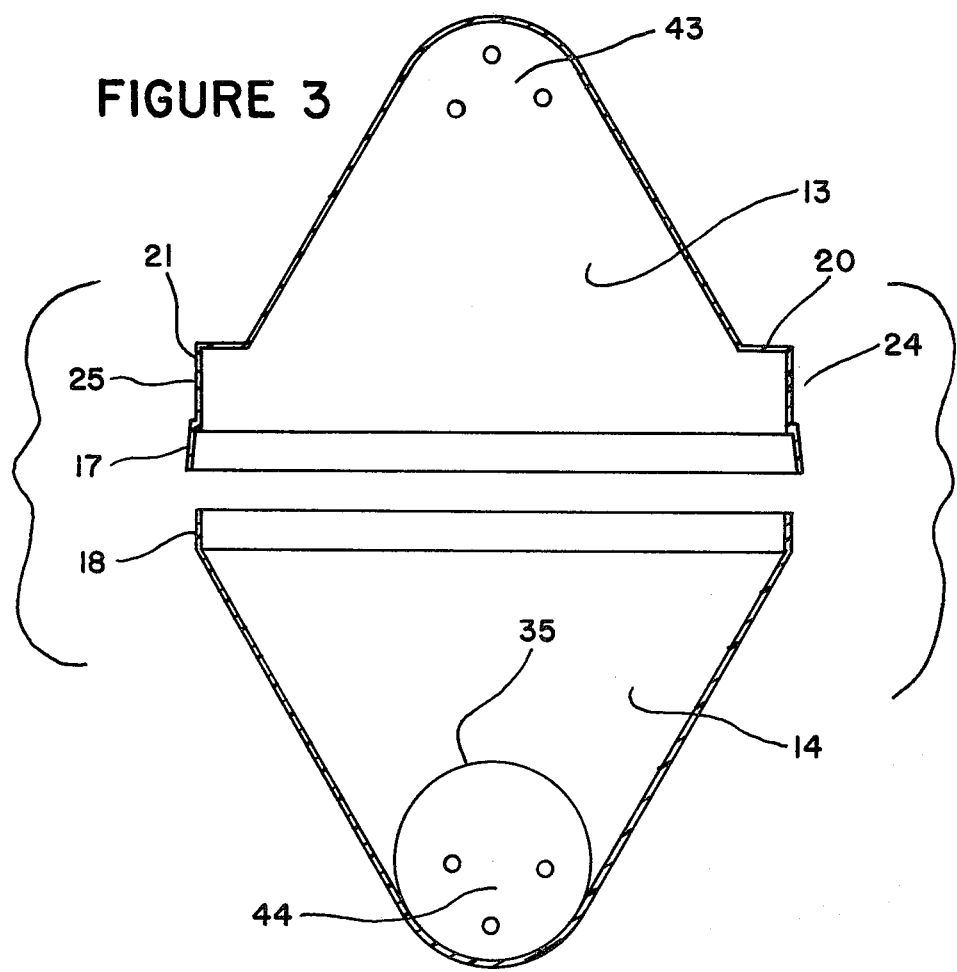
FIG. 3, is an enlarged cross-sectional exploded view of the conical diverter unit showing the manner in which the two halves are joined to form the complete diverter unit.

Cone 13, is provided adjacent its base 15, as shown in FIGS. 2, and 3, with oppositely disposed bosses or extensions 20, and 21, to which flexible straps 22, and 23, respectively, preferably of nylon, are attached to support the conical diverter unit 12, below the open depending end of the outlet "T", or any existing extension thereof. The rounded apex of cone 13, should be positioned so as to divert the rising particles of sludge from entering the outlet "T", but leaving sufficient space between the lower end of the coupling to permit the flow of effluent into the outlet "T".

Figure 5:
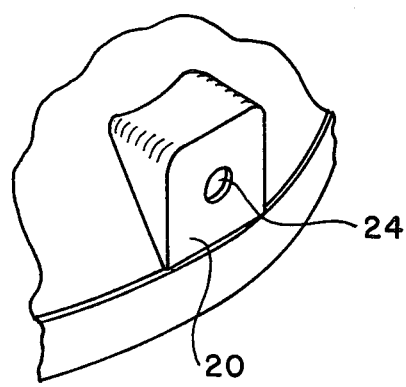
FIG. 5, is a prospective view of a portion of one of the sections of the conical diverter unit, showing the boss or extension to which the flexible supporting means for the diverter unit is attached.

The shape and construction of the bosses or extensions 20, and 21, are shown in detail in FIG. 5. Each boss or extension, as illustrated in FIG. 3, is provided with a hole 24, and 25, respectively, to receive a resilient nylon plug or "rivet" 26, and 26', which may readily snapped into place in the holes to form a suitable support.

Figure 4:
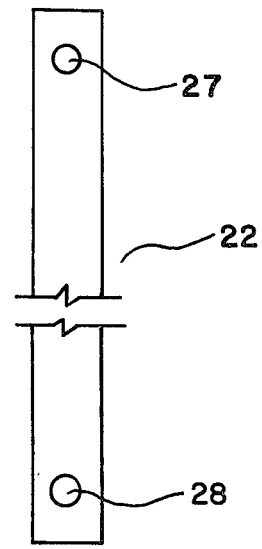
FIG. 4, is a plan view of a flexible strap for supporting the conical diverter unit from a coupling attached to the lower opening of the outlet "T".

A preferred form of flexible strap 22, is shown in FIG. 4, each strap being provided at opposite ends thereof with holes 27, and 28, to receive resilient nylon plugs or "rivets" to attach the conical diverter unit, and to a short coupling 29, as hereinafter described.

In order to provide a pre-fabricated and readily handled unit for installation in existing as well as new septic tank systems, without modification of the plumbing, the conical diverter unit is flexibly suspended from a short coupling 29, preferably of PVC or ABS plastic, having an external diameter slightly less than the inside diameter of the depending leg 7, of the outlet "T", or any extension thereof, to form a tight fit therewith. The coupling may be secured to the "T" with a suitable adhesive to provide a secure support for the conical diverter unit.

In order to properly position the coupling on the depending leg 7, of the outlet "T", the latter is provided adjacent its lower end with an internal rib 34, to engage the upper edges of the coupling 29. Near the lower edge of the coupling 29, diametrically opposed holes 30, and 31, are drilled to receive resilient nylon fasteners or "rivets" 32, and 33, of the same type as described above in attaching the flexible straps to the conical diverter unit. These fasteners, when snapped into place in the holes in the coupling, provide means for attaching the flexible straps 22, and 23, to support the di-cone unit from the coupling 29.

The flexible mounting permits the conical diverter unit to be readily moved aside so that a reamer or cleaning tool can be inserted to remove any accumulation of deposits on the internal surfaces of the outlet "T".

Before the two mating cones constituting the conical diverter unit are sealed together, nylon plugs or "rivets", of the type referred to above, are inserted in holes 24, and 25, in cone 13, a freely movable weight 35, of marble, glass, plastic, or other suitable material, is placed within the cone.

The location of the point at which the flexible straps 22, and 23, are attached to the conical diverter unit, permits the unit to return to its operative position upon removal of the reamer or cleaning tool. In order to insure that there will be no tendency for the conical diverter unit to float in the surrounding effluent and that the unit will always return to its operative position, both cones are provided with a plurality of holes, 43, and 44, respectively, to permit liquid from the effluent to enter the di-cone unit and air to escape therefrom.

Figure 6:
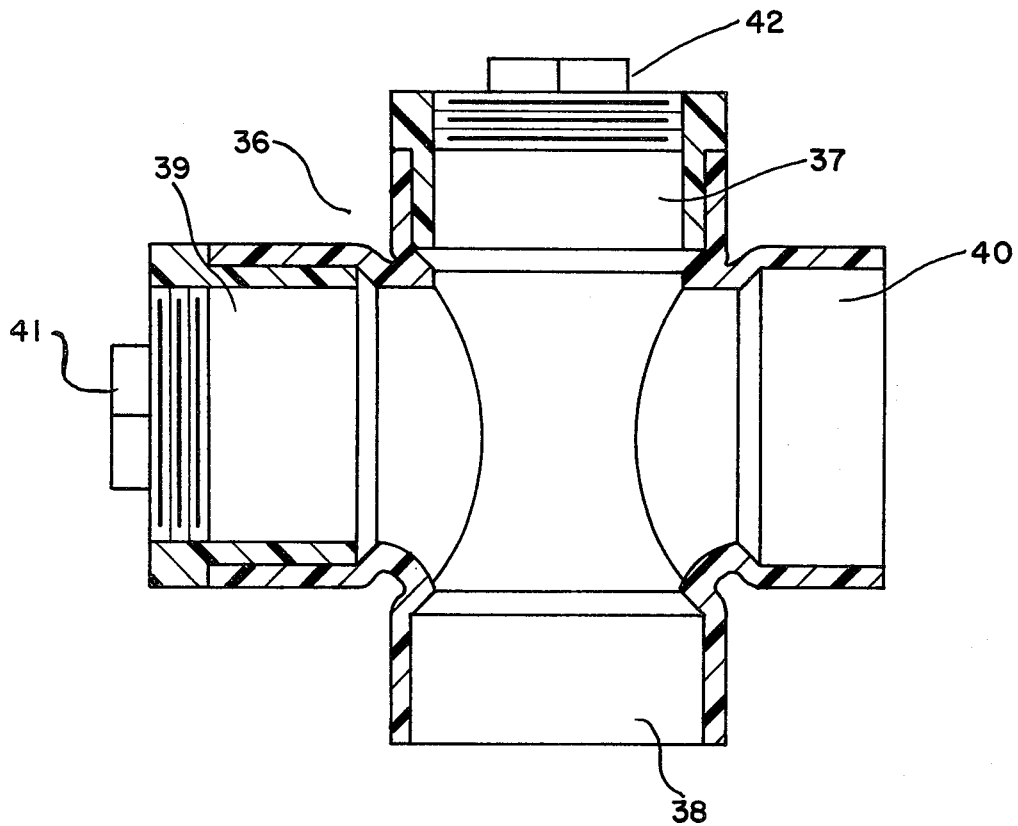
FIG. 6, is a cross-sectional view of a modification in which a "cross rather than a "T" is employed for the outlet from the septic tank.

While the above description has been primarily directed to the use of an outlet "T", it will be understood that a conventional "cross" fitting, preferably formed of PVC, ABS, or equivalent plastic, may be used for this purpose, as shown in FIG. 6, of the drawing. The "cross" comprises vertical legs 37, and 38, and transverse legs 39, and 40, the transverse leg opening into the septic tank being provided with a removable cap 41.

The vertical leg 37 would normally be left open but it may, if desired, be closed with a removable cap 42.

My invention has been described with reference to the preferred embodiments thereof, but it will be understood that variations and changes, obvious to those skilled in the art, may be made within the scope and spirit of the appended claims.

I claim:

1. A conic deflector unit for mounting below the open end of an outlet "T" of a septic tank without modification of the tank or associated plumbing, comprising,
   a conic deflector,
   means flexible in more than a single plane for supporting the conic deflector below an outlet "T" of the septic tank, whereby the deflector may be moved aside to permit a cleaning tool to be inserted in the vertical section of the outlet "T" to remove any accumulation of deposits therefrom, and
   means for returning the deflector to operable position upon removal of the cleaning tool.

2. A conic deflector unit as defined in claim 1, in which the conic deflector comprises a pair of mating cones joined at their bases to form a di-cone unit.

3. A conic deflector unit as defined in claim 2, in which the di-cone deflector encloses a freely movable weight to return the deflector to operable position upon removal of the cleaning tool.

4. A conic deflector unit as defined in claim 2, in which the cones of the deflector unit are provided with a plurality of holes permitting the entrance of liquid and the escape of air therefrom.

5. A conic deflector unit as defined in claim 1, including a coupling adapted to fit over the open lower end of the outlet "T", and
   said flexible means comprising straps attached to and depending from the coupling and attached to the conic deflector at a point above the mid-section thereof to support the same.

6. A conic deflector unit, as defined in claim 5, in which the plastic coupling is PVC, and the flexible straps are nylon.

7. A conic deflector unit as defined in claim 5, in which the plastic straps are nylon.

8. In a septic tank system comprising,
   a septic tank having an inlet for sewage and wastes,
   an outlet "T" for the discharge of effluent,
   a dual cone deflector flexibly movable in more than a single plane supported below the the lower open end of the outlet "T", to deflect therefrom effluent containing in suspension solid particles of sewage rising from the bottom of the tank during the fermentation process, the flexible mounting permitting displacement of the deflector so that a cleaning tool may be inserted to remove any accumulation of deposits from the interior surfaces of the outlet "T".

9. A septic tank system as defined in claim 8, in which the deflector is weighted so that it will return to its operable position upon withdrawal of the cleaning tool.

10. A septic system as defined in claim 8, in which the dual cone deflector comprises a pair of conical sections joined at their bases to form a di-cone unit, the apexes of the cones having a rounded configuration and a central reinforced section having attached thereto resilient nylon fasteners, and means attached to said fasteners to flexibly support the di-cone unit below the lower open end of the outlet "T".

* * * * *